US011588948B2

(12) United States Patent
Nguyen (10) Patent No.: US 11,588,948 B2
(45) Date of Patent: Feb. 21, 2023

(54) DISCHARGE TRAY DEVICE AND AUTOMATIC DOCUMENT FEEDER PROVIDED WITH THE DISCHARGE TRAY DEVICE

(71) Applicant: KYOCERA Document Solutions Inc., Osaka (JP)

(72) Inventor: Van An Nguyen, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/506,802

(22) Filed: Oct. 21, 2021

(65) Prior Publication Data

US 2022/0131991 A1 Apr. 28, 2022

(30) Foreign Application Priority Data

Oct. 26, 2020 (JP) .............................. JP2020-178686

(51) Int. Cl.
*H04N 1/00* (2006.01)
(52) U.S. Cl.
CPC ..... *H04N 1/00631* (2013.01); *H04N 1/00037* (2013.01); *H04N 1/00408* (2013.01)
(58) Field of Classification Search
CPC ................................................. H04N 1/00631

USPC .......................................................... 358/442
See application file for complete search history.

(56) References Cited

U.S. PATENT DOCUMENTS

| 2009/0129892 | A1* | 5/2009 | Okada | B42B 5/103 412/11 |
| 2016/0185556 | A1* | 6/2016 | Ito | B65H 31/02 271/220 |
| 2016/0332833 | A1* | 11/2016 | Kakuta | B65H 1/04 |
| 2022/0038592 | A1* | 2/2022 | Fuji | H04N 1/00612 |

FOREIGN PATENT DOCUMENTS

JP 2020-147406 9/2020

* cited by examiner

*Primary Examiner* — Jacky X Zheng
(74) *Attorney, Agent, or Firm* — Lex IP Meister, PLLC (57) ABSTRACT

A sheet discharge device includes a sheet discharge tray, a stopper, a sheet size detection unit, and a display unit. In the sheet discharge tray, sheets discharged from a sheet discharge port are stacked on the upper surface. The stopper is provided on a upper surface side of the sheet discharge tray and is movable to a position corresponding to the leading end of each of a plurality of sheet sizes to be used in a sheet discharge direction, and regulates the position of the leading end of the sheet. The sheet size detection unit detects the sheet size corresponding to the position of the stopper. The display unit visually displays the sheet size detected by the sheet size detection unit.

4 Claims, 8 Drawing Sheets

DISCHARGE TRAY DEVICE AND AUTOMATIC DOCUMENT FEEDER PROVIDED WITH THE DISCHARGE TRAY DEVICE

INCORPORATION BY REFERENCE

This application claims priority on the basis of Japanese Application No. 2020-178686, filed Oct. 26, 2020, and incorporates the contents of said application.

BACKGROUND

The present disclosure relates to an discharge tray device and an automatic document feeder provided with the discharge tray device.

In general, a sheet discharge device mounted on an automatic document feeder (ADF) or the like has a discharge tray on which sheets discharged from a sheet discharge port are stacked, and a stopper on which the leading end of the sheets stacked on the discharge tray abuts. The stopper has a function of aligning the leading end position of the sheet discharged to the discharge tray and preventing the sheet from jumping out of the discharge tray, for example.

As an example of such a sheet discharge device, there is known a device in which the position of the stopper can be adjusted in the sheet discharge direction according to the size of the sheet discharged to the discharge tray. The stopper is configured to be movable along a slide groove extending in the sheet discharge direction in the upper surface portion of the discharge tray. Marks corresponding to respective leading end positions of a plurality of sheet sizes (for example, a postcard, a B5 horizontal size, an A4 horizontal size, a B5 vertical size, an A4 vertical size, and the like) are attached to an edge portion of the slide groove. By adjusting the position of the stopper to the position of each mark in accordance with the size of the sheet to be used, the user can arrange the stopper in an appropriate position.

However, in the conventional sheet discharge device, when the position of the stopper is adjusted, it is necessary to slide the stopper while viewing a mark corresponding to a sheet size to be used from among a plurality of marks arranged along the slide groove. Such an operation is troublesome for the user, and particularly when the sheet supply tray is disposed on the upper side of the sheet discharge tray, the mark is difficult to be seen by the user, which increases a sense of annoyance.

SUMMARY

A sheet discharge device according to one aspect of the present disclosure includes a sheet discharge tray, a stopper, a sheet size detection unit, and a display unit. In the sheet discharge tray, sheets discharged from a sheet discharge port are stacked on the upper surface. The stopper is provided on a upper surface side of the sheet discharge tray and is configured to be movable to a position corresponding to the leading end of each of a plurality of sheet sizes to be used in the sheet discharge direction, and regulates the leading end position of the sheet. The sheet size detection unit detects the sheet size corresponding to the position of the stopper. The display unit visually displays the sheet size detected by the sheet size detection unit.

An automatic document feeder according to another aspect of the present disclosure includes the sheet discharge device.

The objects, features, and advantages of the present disclosure will become more apparent from the detailed description that follows. In the detailed description, reference will be made to the accompanying drawings in which preferred embodiments of the present disclosure are shown by way of example.

BRIEF DESCRIPTION OF THE INVENTION

DETAILED DESCRIPTION

Embodiments of the present disclosure will now be described in detail with reference to the drawings. Note that the present disclosure is not limited to the following embodiments.

[Embodiment]

Figure 1:
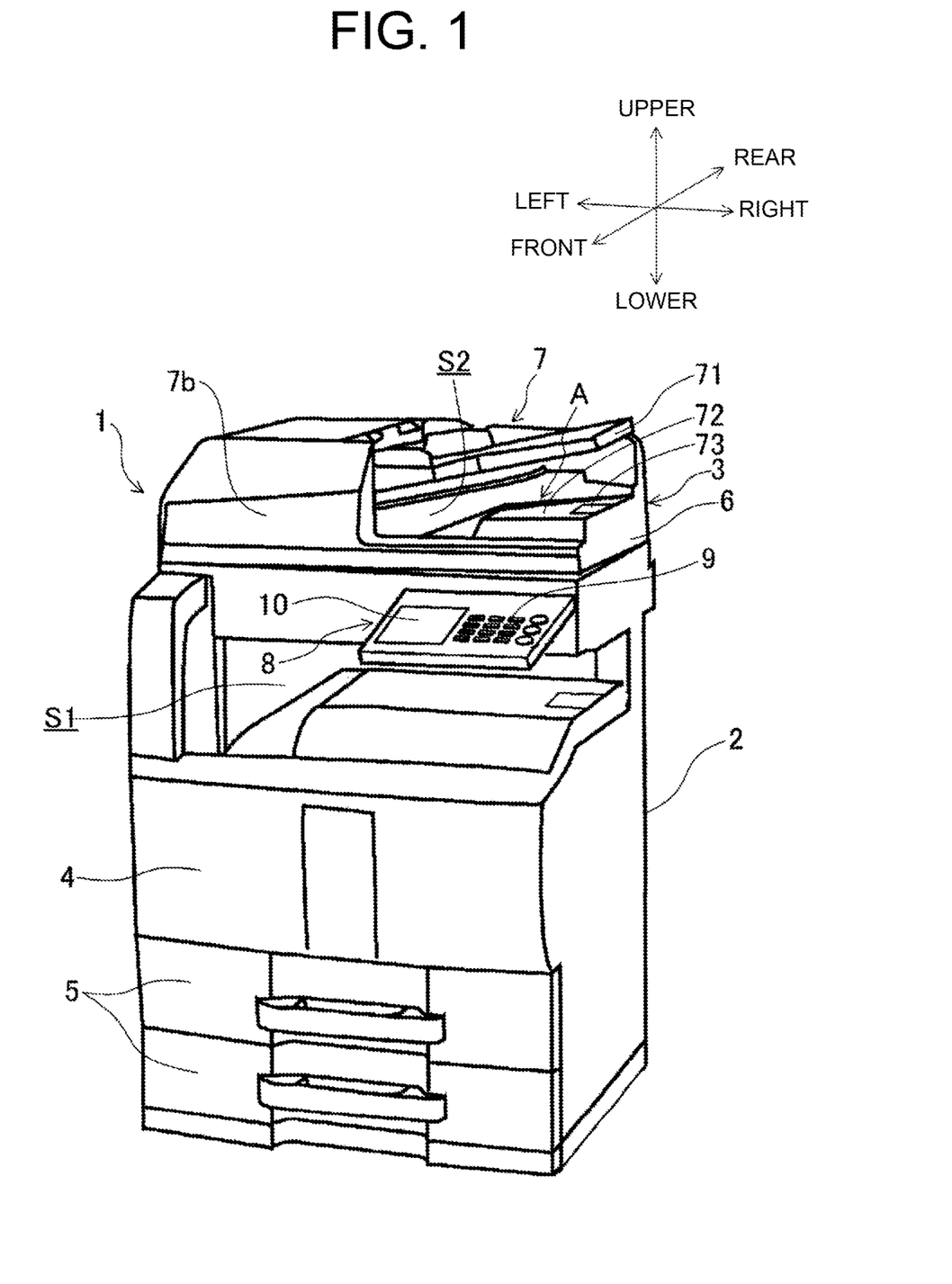
FIG. 1 is an external perspective view showing an image forming apparatus provided with an automatic document feeder including a discharge tray device according to the present embodiment.

FIG. 1 shows an image forming apparatus 1 on which an automatic document feeder 7 having a discharge tray device A according to an embodiment is mounted. The image forming apparatus 1 is a multi-functional image forming apparatus (multi-function peripheral) having a scanner function, a facsimile function, and a copy function in addition to a printing function. In the following description, the front side and the rear side mean the front side and the rear side of the image forming apparatus 1, and the left side and the right side mean the left side and the right side when the image forming apparatus 1 is viewed from the front side.

The image forming apparatus 1 includes an image forming apparatus main body 2 and an image reading section 3 disposed above the image forming apparatus main body 2. The image forming apparatus main body 2 has a printing section 4 disposed at an intermediate portion in the vertical direction thereof and a plurality of sheet feeding cassettes 5 disposed below the printing section 4. Sheets of different sizes are accommodated in the respective sheet feeding cassettes 5. The printing section 4 prints a sheet supplied from the sheet feeding cassette 5 based on predetermined image data. For example, an electrophotographic system is adopted as a printing system in the printing section 4. That is, the printing section 4 irradiates the surface of the photosensitive drum with laser light corresponding to image data to form an electrostatic latent image, develops the electrostatic latent image with toner, and transfers the image onto the sheet. The sheet after the image printing by the printing section 4 is discharged to the in-body discharge space 51 provided between the printing section 4 and the image reading section 3.

The image reading section 3 optically reads an image of a document placed on the contact glass on the upper surface thereof. The upper surface of the image reading section 3 is covered by a document holding cover 6 for holding a document so as to be openable and closable. The document holding cover 6 is integrated with the automatic document feeder 7. The automatic document feeder 7 receives a document (an example of a sheet) set in the sheet supply tray 71 from a sheet supply port (not shown), transports the document along a predetermined transport path, passes an image reading position set on the contact glass, and then discharges the document to a sheet discharge tray 72 which is a part of a discharge tray device A to be described later. An operation panel 8 is formed so as to project from the front surface of the image reading section 3. The operation panel 8 is provided with an operation unit 9 including a numeric keypad and a start key, and a display unit 10 including a liquid crystal display.

[Discharge Tray Device Configuration]

In addition to the sheet discharge tray 72, the discharge tray device A includes a stopper 73, a dial plate for displaying the sheet size (see FIG. 6 to be described later), and an interlocking member 80 for rotating the dial plate about its central axis in conjunction with the movement of the stopper 73.

Figure 2:
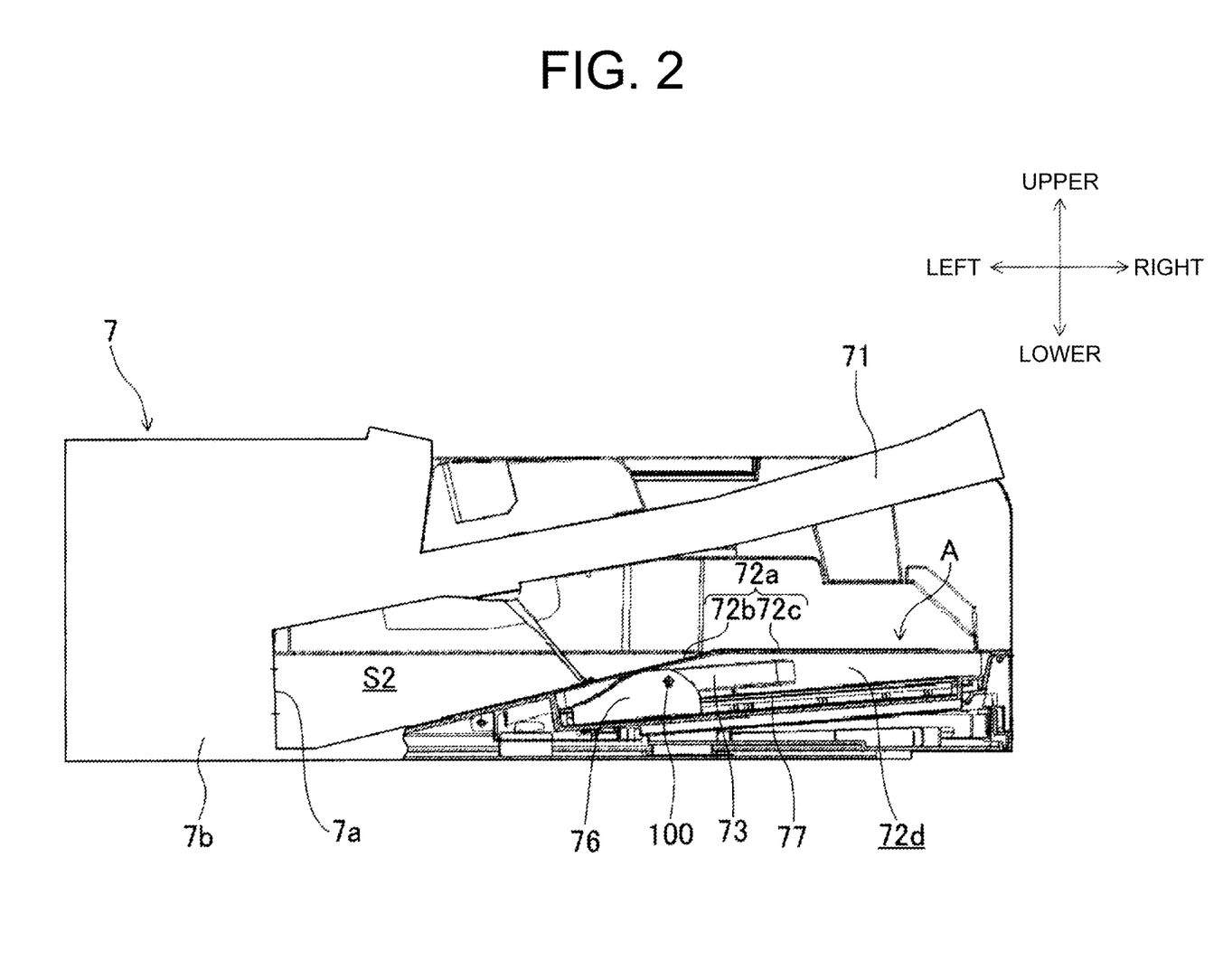
FIG. 2 is a longitudinal sectional view taken along the sheet discharge direction showing the automatic document feeder.
Figure 3:
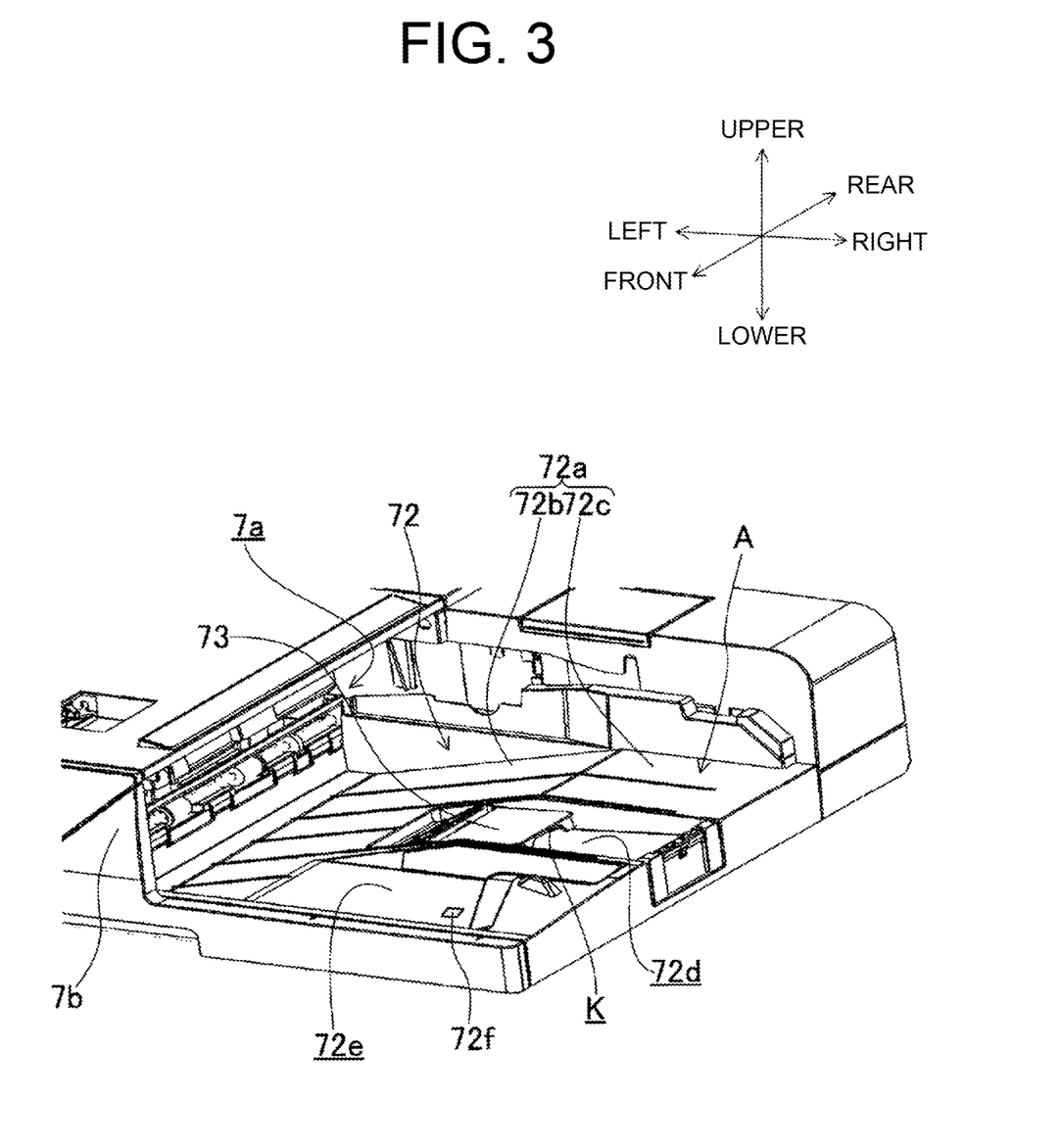
FIG. 3 is an external perspective view showing a state in which the sheet supply tray is removed from the automatic document feeder.

As shown in FIGS. 2 and 3, the sheet discharge tray 72 is disposed on the right side of the case body 7b for accommodating the transport path of the automatic document feeder 7. A sheet discharge port 7a is provided on the right side surface of the case body 7b. The sheet discharge tray 72 has a discharge surface portion 72a for receiving a sheet discharged from the sheet discharge port 7a.

As shown in FIGS. 2 to 5, the sheets discharged from the sheet discharge port 7a are sequentially stacked on the discharge surface portion 72a. A space S2 (see FIG. 2) is formed between the discharge surface portion 72a and the sheet supply tray 71. The user can take out the sheet on the discharge surface portion 72a by putting his or her hand into the space S2.

The discharge surface portion 72a has a rectangular shape that is long in the left-right direction of the image forming apparatus 1 when viewed from above. In this embodiment, the left-right direction of the image forming apparatus 1 coincides with the sheet discharge direction in the discharge surface portion 72a, the left side corresponds to the upstream side in the sheet discharge direction, and the right side corresponds to the downstream side in the sheet discharge direction.

As shown in FIGS. 2 and 3, the discharge surface portion 72a has an upstream-side inclined surface 72b located on the upstream side in the sheet discharge direction and a downstream-side flat surface 72c located on the downstream side. The upstream-side inclined surface 72b is connected to the lower edge of the right side surface of the case body 7b, and is inclined upward toward the downstream side in the sheet discharge direction. The downstream-side flat surface 72c is a horizontal flat surface and is connected to the downstream edge of the upstream-side inclined surface 72b. Sheets of a normal size or smaller discharged from the sheet discharge port 7a are stacked within the range of the upstream-side inclined surface 72b, and sheets of a large size are stacked in a state straddling the upstream-side inclined surface 72b and the downstream-side flat surface 72c.

As shown in FIG. 3, a working recess 72e, being substantially trapezoidal in a plan view and extending in the left-right direction, is formed at the front end portion of the discharge surface portion 72a. The working recess 72e is a concave portion opened to the front side and the upper side, and when the user takes out the sheet discharged to the discharge surface portion 72a, the user can easily take out the sheet by inserting a finger into the lower side of the sheet through the working recess 72e.

A dial plate 90 described later is accommodated in the back surface side of the working recess 72e in the sheet discharge tray 72, and a rectangular opening window 72f is formed in the bottom wall portion of the working recess 72e. The opening window 72f has a function (display function) of visually exposing the sheet size corresponding to the current position of the stopper 73 among a plurality of sheet sizes (size characters 91a) attached to the dial plate 90.

[Stopper Configuration]

Figure 4:
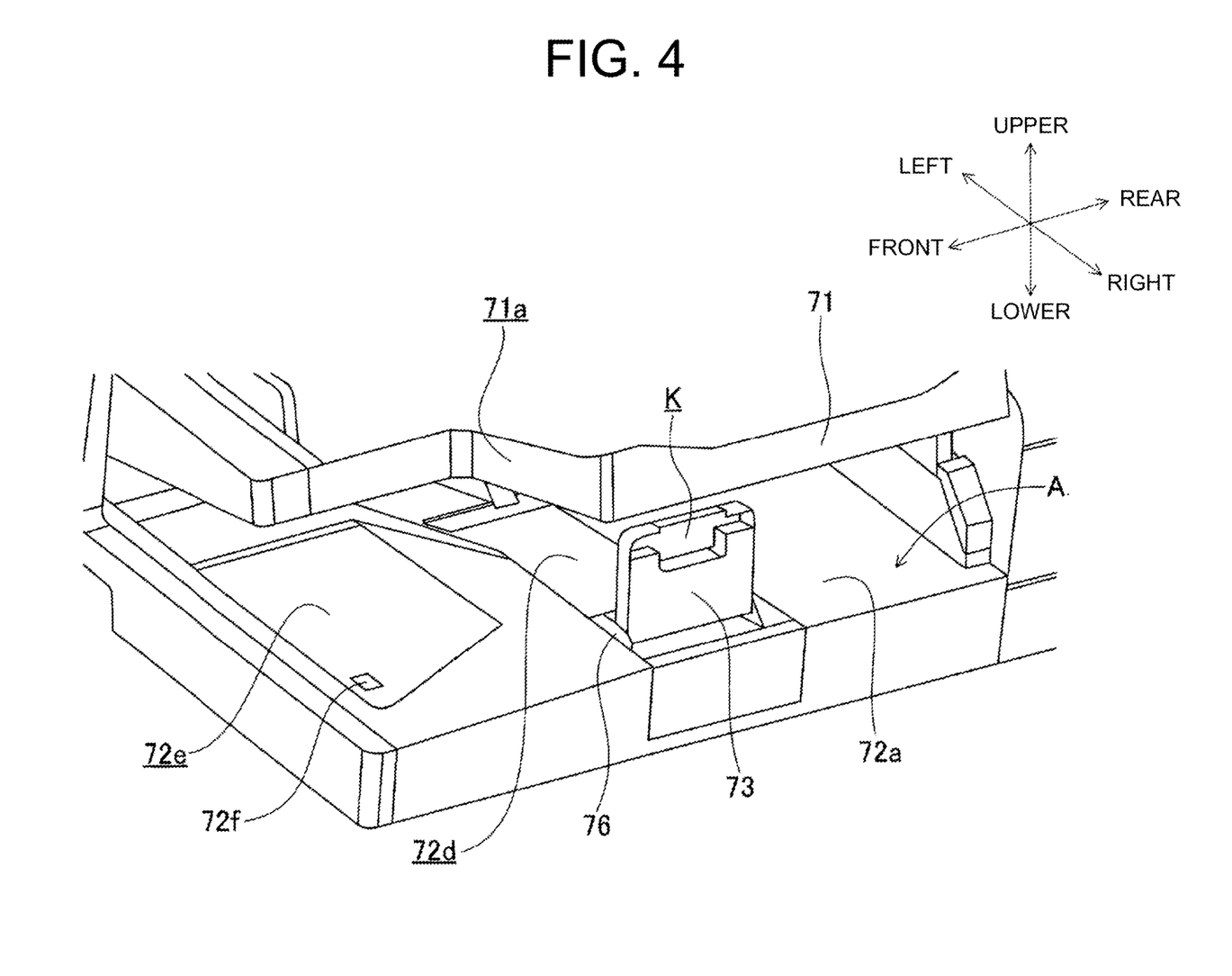
FIG. 4 is a perspective view of the automatic document feeder as seen from an oblique right side of the front side.
Figure 5:
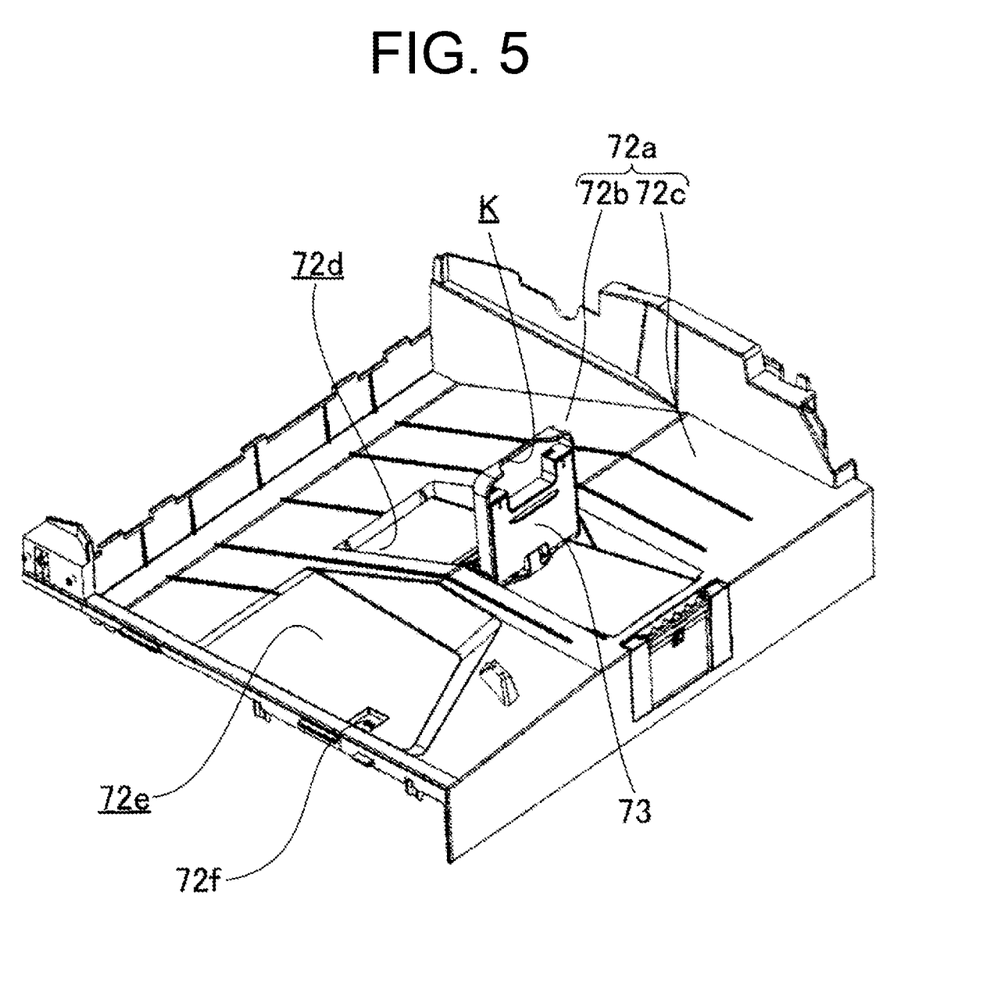
FIG. 5 is a perspective view showing the discharge tray device.

As shown in FIGS. 3 and 4, the stopper 73 is designed to block and align the sheet discharged to the discharge surface portion 72a, and is configured to be capable of being raised and lowered relative to the discharge surface portion 72a.

The stopper 73 is in the shape of a flat rectangular case and is made of, for example, a resin member. The stopper 73 is disposed in a state in which the width direction thereof coincides with the sheet width direction (a direction orthogonal to the sheet discharge direction). One of the pair of end edges extending in the width direction of the stopper 73 is supported by the support shaft 100 (see FIG. 2). The stopper 73 is rotatable between the standing position (see FIG. 4) and the lying position (see FIG. 3) with the support shaft 100 as a fulcrum. In the standing position, the stopper 73 contacts the downstream side edge of the sheet discharged from the sheet discharge port 7a to dam and arrange the sheets.

The stopper 73 is accommodated in the stopper receiving recess 72d formed in the discharge surface portion 72a at the lying position. A biasing mechanism (not shown) including a compression coil spring is housed in the stopper 73. The urging mechanism is configured to urge the stopper 73 to the standing position when the inclination angle of the stopper 73 with respect to the lying position is equal to or greater than a predetermined angle, while urging the stopper 73 to the lying position when the inclination angle is less than the predetermined angle. Since the stopper 73 can be switched between the standing position and the lying position in this manner, the user can make the stopper 73 stand only when necessary, thereby the convenience is improved.

As shown in FIGS. 2 to 4, the stopper receiving recess 72d is a rectangular parallelepiped recess which is long in the sheet discharge direction, and is provided at a center portion of the discharge surface portion 72a in the sheet width direction (a direction orthogonal to the sheet discharge direction). The stopper receiving recess 72d is formed from the vicinity of the center portion of the upstream-side inclined surface 72b in the sheet discharge direction to the upstream-side end portion of the downstream-side flat surface 72c (see FIG. 3) in the sheet discharge direction.

A slider 76 (see FIG. 2) for supporting the support shaft 100 is provided in the stopper receiving recess 72d. The slider 76 is engaged with a rail plate 77 disposed with a slight gap with respect to the bottom wall surface of the stopper receiving recess 72d. The slider 76 is slidable along the rail plate 77 in the sheet discharge direction. The slider 76 is connected to the stopper 73 via a support shaft 100.

Therefore, by adjusting the slide position of the slider 76, the position of the stopper 73 can be changed according to the sheet size.

Figure 6:
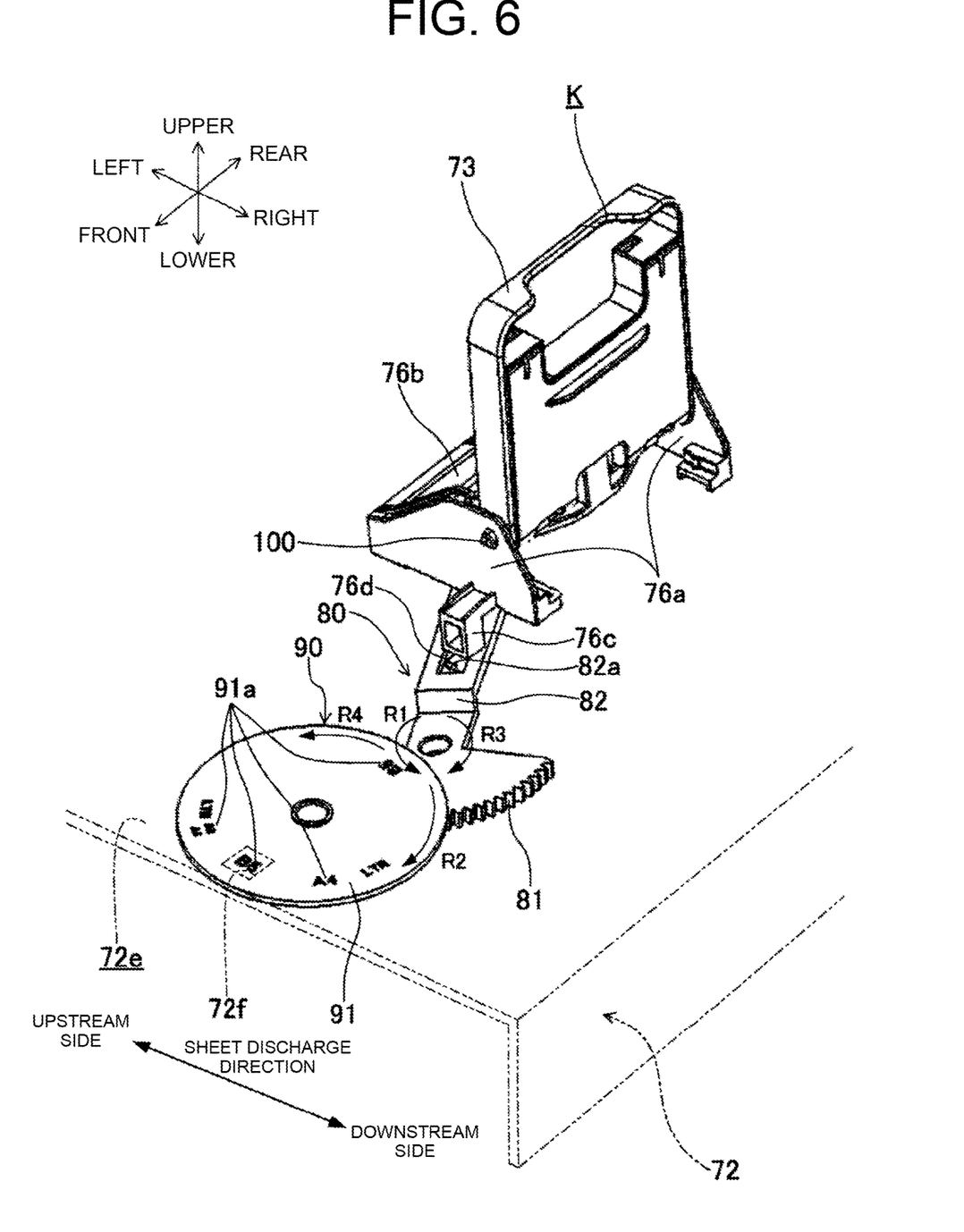
FIG. 6 is a perspective view showing an interlocking mechanism between a stopper and a dial plate via an interlocking member.

As shown in FIG. 6, the slider 76 has a pair of support plate portions 76a facing each other in the sheet width direction (front-rear direction), a base table 76b connecting the pair of support plate portions 76a, and a connecting engagement piece 76c projecting from the front side surface of the front support plate portion 76a and engaging with an interlocking member 80 to be described later.

The pair of support plate portions 76a are each formed in a substantially trapezoidal shape, and both end portions of the support shaft 100 are rotatably supported by through holes formed in the upper end portions of the support plate portions 76a.

The connecting engagement piece 76c is formed of an L-shaped block piece that projects forward from the front side surface of the front support plate portion 76a and then bends downward. A T-shaped engagement member 76d is screwed into the lower end surface of the distal end of the connecting engagement piece 76c, and the engagement member 76d and the interlocking member 80 are engaged and connected to each other.

The base table 76b has a hollow flat plate-like slide groove (not shown) that penetrates in the sheet discharge direction (left-right direction). The slide groove is slidably fitted in a rail plate 77 (see FIG. 2) provided in the stopper receiving recess 72d and extending in the sheet discharge direction. It is preferable that the fitting between the slide groove and the rail plate 77 is set to be slightly tight so that the positioning of the slider 76 can be adjusted and the slider 76 does not move carelessly after the adjustment.

The stopper 73 has a notch K that allows the user to insert a finger of the hand at the lying position shown in FIG. 3. When the user switches the stopper 73 from the lying position to the standing position, the user puts their finger into the notch K and lifts the stopper 73 upward. Then, by rotating the stopper 73 until it comes into contact with a regulating member (not shown), the stopper 73 is switched to the standing position shown in FIG. 4. On the other hand, when the stopper 73 in the standing position is switched to the lying position, the stopper 73 may be rotated around the support shaft 100 to the lower right side in FIG. 4.

[Interlocking Member Configuration]

The interlocking member 80 is a member for rotating the dial plate 90 in conjunction with the movement of the stopper 73 in the sheet discharge direction.

Figure 7:
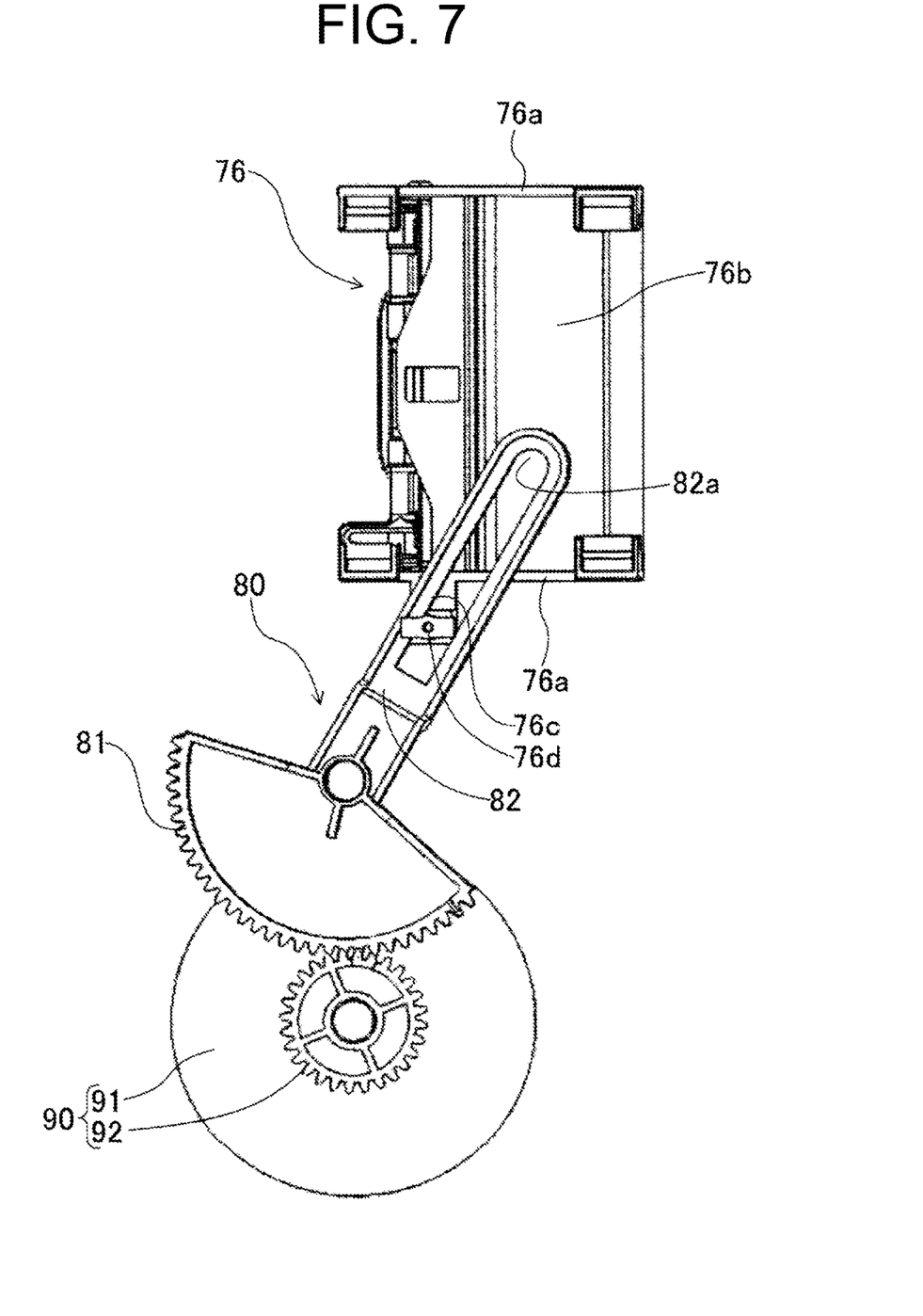
FIG. 7 is a plan view, viewed from below, showing the interlocking mechanism between the stopper and the dial plate via the interlocking member.

As shown in FIGS. 6 and 7, the interlocking member 80 has an arc-shaped gear portion 81 and a connecting plate portion 82.

The arc-shaped gear portion 81 has a fan-like shape in a plan view, and a large number of teeth are formed at a predetermined pitch over the entire circumference on the peripheral surface thereof.

The connecting plate portion 82 extends radially outward from the center portion of the arc-shaped gear portion 81 along the extension line of a straight line dividing the fan-shaped central angle of the arc-shaped gear portion 81 into two equal parts.

The connecting plate portion 82 is formed with an elongated hole 82a extending in the extending direction thereof. An engagement member 76d (see FIG. 7) attached to the distal end of the connecting engagement piece 76c is engaged with the end edge portion extending in the longitudinal direction of the elongated hole 82a. The engagement member 76d is engaged with the elongated hole 82a so as to be relatively movable in the longitudinal direction thereof.

[Dial Plate Configuration]

As shown in FIG. 7, the dial plate 90 has a disk-shaped dial main body 91 and a small-diameter gear portion 92 fixed coaxially with the dial main body 91 and integrally on the back surface thereof.

The small-diameter gear portion 92 is meshed with the arc-shaped gear portion 81 of the interlocking member 80, and the small-diameter gear portion 92 rotates together with the dial main body 91 by rotating the interlocking member 80 in conjunction with the movement of the stopper 73 as will be described later.

Figure 8:
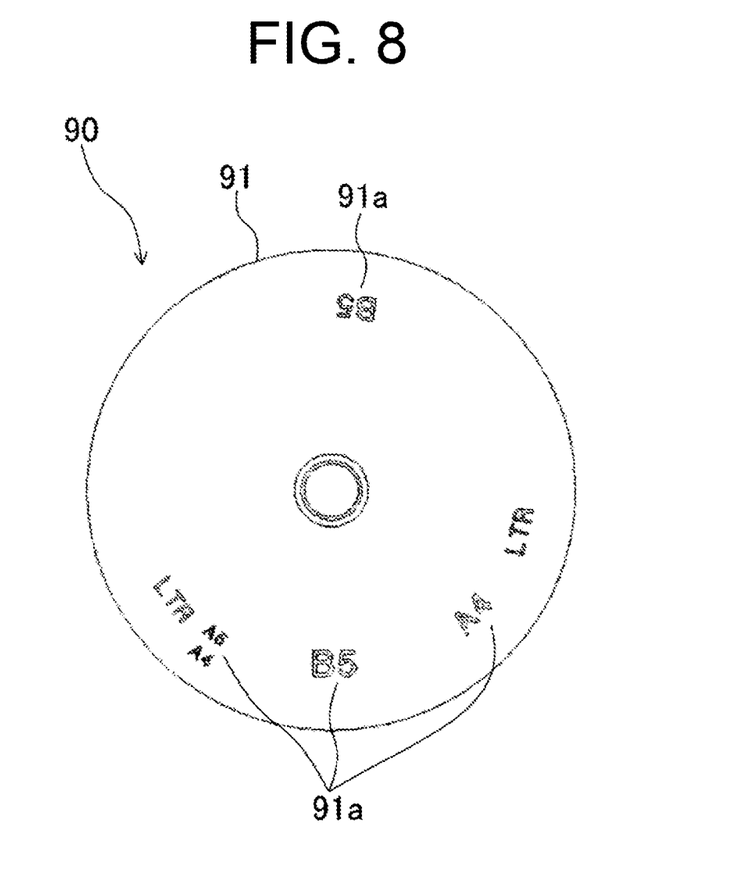
FIG. 8 is an enlarged plan view of the dial plate as viewed from above.

As shown in enlarged view in FIG. 8, size characters 91a corresponding to a plurality of sheet sizes to be used are attached to the front surface (being the upper surface and the surface opposite to the back surface) of the dial main body 91. The size character 91a can be attached in various ways such as stamping, affixing of a seal, or painting. In the example shown in FIG. 9, sizes such as A4 size, B5 size, and LTR (letter size) are set as an example of the size characters 91a. These size characters 91a are attached to the periphery of the dial main body 91 at intervals in the circumferential direction.

As shown in FIG. 6, an opening window 72f is formed in the sheet discharge tray 72 so that one of a plurality of size characters 91a attached to the dial main body 91 is exposed so as to be visible from the outside. The opening window 72f is formed at the right and front ends of the bottom wall of the working recess 72e. More specifically, as shown in FIG. 4, the opening window 72f is located directly below the defective portion 71a formed at the front and right corners of the sheet supply tray 71, so that the size characters 91a exposed from the opening window 72f through the defective portion 71a can be visually recognized even from a viewpoint higher than the sheet supply tray 71.

[Rotating Motion of Dial Plate Accompanying Movement of Stopper]

Referring to FIG. 6, the rotation operation of the dial plate 90 accompanying the movement of the stopper 73 will be described. When the slider 76 supporting the stopper 73 is moved to the upstream side in the sheet discharge direction, the engagement member 76d attached to the connecting engagement piece 76c of the slider 76 slides along the elongated hole 82a of the interlocking member 80 and rotates the interlocking member 80 about its central axis in the direction R1 in the figure. Since the arc-shaped gear portion 81 of the interlocking member 80 is meshed with the small-diameter gear portion 92 of the dial plate 90, the dial plate 90 is rotated in the direction R2 in the figure by the rotation of the interlocking member 80. On the contrary, when the slider 76 supporting the stopper 73 is moved to the downstream side in the sheet discharge direction, the engagement member 76d slides along the elongated hole 82a of the interlocking member 80, and the interlocking member 80 is rotated in the direction R3 in the figure about its central axis. As a result, the small-diameter gear portion 92 of the dial plate 90 meshed with the arc-shaped gear portion 81 of the interlocking member 80 is rotationally driven, and the dial plate 90 is rotated in the direction R4 in the figure.

In this manner, the dial plate 90 is driven to rotate at different angles around its central axis in accordance with the position of the stopper 73 in the sheet discharge direction. When the stopper 73 is moved to a position corresponding to the respective leading end positions of a plurality of predetermined sheet sizes (A4 size, B5 size, LTR (letter) size, and the like), the size characters 91a corresponding to the position of the stopper 73 are positioned in the opening window 72*f* formed in the sheet discharge tray 72.

[Effect]

As described above, in the discharge tray device A of the present embodiment, by rotating the dial plate 90 through the interlocking member 80 connected to the stopper 73, the sheet size corresponding to the position of the stopper 73 is detected, and the size character 91*a* corresponding to the detected sheet size is visually displayed through the opening window 72*f*. Here, the interlocking member 80 and the dial plate 90 function as a sheet size detection unit, and the opening window 72*f* functions as a display unit.

According to this configuration, when the user slides the stopper 73 in the sheet discharge direction, the sheet size corresponding to the position is automatically displayed in the opening window 72*f*. Accordingly, when the position of the stopper 73 is adjusted as in the prior art, there is no need for the troublesome work of finding a mark corresponding to the sheet size to be used and sliding the stopper 73 without turning away the line of sight. Therefore, it is possible to easily adjust the position of the stopper 73. Further, since the sheet size detection unit is constituted by a simple mechanical mechanism including the dial plate 90 and the interlocking member 80, the cost can be reduced as compared with the case where the position of the stopper 73 is detected by using a sensor or the like.

Further, in the present embodiment, a working recess 72*e* is formed in the front side (predetermined user working side) end portion of the upper surface of the sheet discharge tray 72 so as to be open to the front side and the upper side so that the user can insert a finger therein, and the opening window 72*f* is formed in the bottom wall portion of the working recess 72*e*.

According to this configuration, the opening window 72*f* can be formed at a position as low as possible by utilizing the working recess 72*e*. Thus, the user can easily visually recognize the opening window 72*f* even from a high line of sight of the user. In particular, when the sheet supply tray 71 is disposed on the upper side of the sheet discharge tray 72 as in the present embodiment, by making the position of the opening window 72*f* as low as possible, it is possible to easily visually recognize the opening window 72*f* without the sheet supply tray 71 getting in the way.

Further, in the present embodiment, a defective portion 71*a* is provided at the front side (predetermined user working side) end portion of the sheet supply tray 71, and the opening window 72*f* is configured to be visible even from a viewpoint higher than the sheet supply tray 71 through the defective portion 71*a*.

According to this configuration, when the user adjusts the position of the stopper 73, the size character 91*a* displayed on the opening window 72*f* can be easily visually recognized from a line of sight higher than that of the sheet supply tray 71 without bending or taking an unreasonable posture to look into the opening window 72*f*.

OTHER EMBODIMENT

Although the mechanical mechanism in which the interlocking member 80 and the dial plate 90 are combined is shown as an example of the sheet size detection unit in the above embodiment, the present invention is not limited to this, and the position of the stopper 73 may be detected by an electrical means such as a sensor, and the sheet size corresponding to the detected position of the stopper 73 may be displayed on the digital display. In this case, the sensor functions as a sheet size detection unit and the digital display functions as a display unit.

Although an example in which the discharge tray device A is applied to the automatic document feeder has been described in the above embodiment, the present invention is not limited to this. The discharge tray device A may be applied to, for example, a sheet discharge tray provided in the body of an in-body discharge type image forming apparatus.

As described above, the present disclosure is useful for an discharge tray device and an automatic document feeder provided with the discharge tray device.

The invention claimed is:

1. A discharge tray device comprising:
   a sheet discharge tray on which sheets discharged from a sheet discharge port are stacked on an upper surface;
   a stopper provided on the upper surface side of the sheet discharge tray to be movable to a position corresponding to a leading end of each of a plurality of sheet sizes to be used in a sheet discharge direction, and regulates the position of the leading end of the sheet;
   a sheet size detection unit that detects a sheet size corresponding to a position of the stopper; and
   a display unit that visually displays the sheet size detected by the sheet size detection unit, wherein:
   the sheet size detection unit including:
   a dial plate that displays the plurality of sheet sizes arranged at intervals in a circumferential direction, the dial plate being rotatable about a central axis; and
   an interlocking member to rotate the dial plate about the center axis thereof in association with movement of the stopper in the sheet discharge direction, wherein
   the dial plate is covered with the sheet discharge tray,
   an opening window serving as the display unit is formed in the sheet discharge tray to expose one of the plurality of sheet sizes displayed on the dial plate so as to be visible from outside, and
   when the stopper is moved to a position corresponding to the position of the leading end of each of the plurality of sheet sizes, the interlocking member rotates the dial plate so that the sheet size corresponding to the position of the stopper is located in the opening window.

2. The automatic document feeder comprising:
   the discharge tray device according to claim 1; and
   a sheet supply tray disposed above the sheet discharge tray, wherein
   a defective portion is provided at a predetermined user working side end portion of the sheet supply tray,
   the display unit is visible even from a viewpoint higher than the sheet supply tray through the defective portion.

3. A The discharge tray device, comprising:
   a sheet discharge tray on which sheets discharged from a sheet discharge port are stacked on an upper surface;
   a stopper provided on the upper surface side of the sheet discharge tray to be movable to a position corresponding to a leading end of each of a plurality of sheet sizes to be used in a sheet discharge direction, and regulates the position of the leading end of the sheet;
   a sheet size detection unit that detects a sheet size corresponding to a position of the stopper; and
   a display unit that visually displays the sheet size detected by the sheet size detection unit, wherein:
   a working recess into which a user can insert a finger is formed at a predetermined user working side end portion on the upper surface of the sheet discharge tray, the working recess being opened to the working side and an upper side, and the display unit is provided on a bottom wall portion of the working recess.

4. The automatic document feeder comprising:

the discharge tray device according to claim 3; and a sheet supply tray disposed above the sheet discharge tray, wherein a defective portion is provided at a predetermined user working side end portion of the sheet supply tray, the display unit is visible even from a viewpoint higher than the sheet supply tray through the defective portion.

* * * * *